United States Patent
Lin et al.

(10) Patent No.: US 10,846,384 B2
(45) Date of Patent: Nov. 24, 2020

(54) IDENTITY AUTHENTICATION DEVICE AND METHOD

(71) Applicant: HON HAI PRECISION INDUSTRY CO., LTD., New Taipei (TW)

(72) Inventors: Jung-Yi Lin, New Taipei (TW); Young-Way Liu, New Taipei (TW); Chin-Pin Kuo, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 245 days.

(21) Appl. No.: 15/993,720

(22) Filed: May 31, 2018

(65) Prior Publication Data
US 2019/0303548 A1    Oct. 3, 2019

(30) Foreign Application Priority Data
Mar. 30, 2018 (CN) .......................... 2018 1 0287300

(51) Int. Cl.
| | |
|---|---|
| *G06F 21/00* | (2013.01) |
| *G06F 21/31* | (2013.01) |
| *G06N 3/02* | (2006.01) |
| *H04L 29/08* | (2006.01) |

(52) U.S. Cl.
CPC ............ *G06F 21/316* (2013.01); *G06N 3/02* (2013.01); *H04L 67/22* (2013.01); *H04L 67/306* (2013.01)

(58) Field of Classification Search
CPC combination set(s) only.
See application file for complete search history.

(56) References Cited

U.S. PATENT DOCUMENTS

| | | | | |
|---|---|---|---|---|
| 2014/0025949 | A1* | 1/2014 | Kay | G06F 21/44 713/168 |
| 2014/0359424 | A1* | 12/2014 | Lin | G06F 16/955 715/234 |
| 2015/0273337 | A1* | 10/2015 | Crowley | A63F 13/73 463/29 |

\* cited by examiner

*Primary Examiner* — Ghazal B Shehni
(74) *Attorney, Agent, or Firm* — ScienBiziP, P.C.

(57) ABSTRACT

An identity authentication device includes a communication unit configured to establish communication with a plurality of online servers, a processor, and a storage configured to store a user profile database including a number of user profiles, wherein each of the user profiles corresponds to an online browsing habit. The processor receives an online browsing record of a user, compares the received online browsing record to the online browsing habits of the user profiles stored in the user profile database to determine whether the received online browsing record matches one of the online browsing habits, and determines whether the received online browsing record belongs to a same user of a matched one of the user profiles according to a result of comparison.

6 Claims, 4 Drawing Sheets

IDENTITY AUTHENTICATION DEVICE AND METHOD

FIELD

The subject matter herein generally relates to device and method for authenticating an identity of a user according to an online browsing record.

BACKGROUND

Generally, when people browse online, they use a virtual identity to protect their privacy. In some situations, such as for law enforcement, it is useful to be able to know an identity of a user online.

BRIEF DESCRIPTION OF THE DRAWINGS

Implementations of the present disclosure will now be described, by way of example only, with reference to the attached figures.

DETAILED DESCRIPTION

Figure 1:
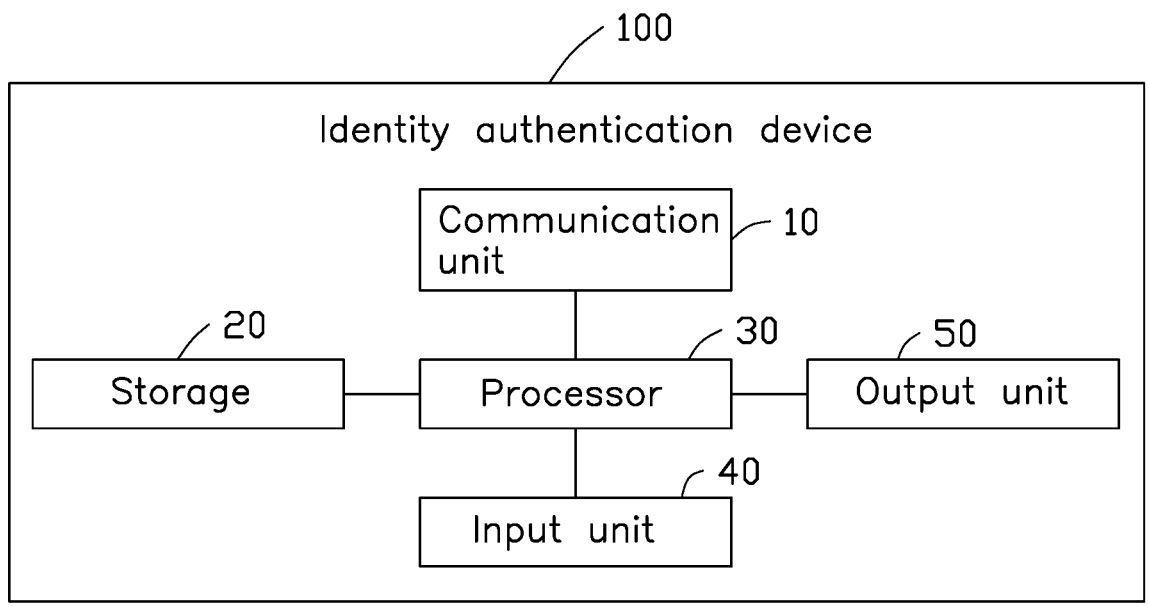
FIG. 1 is a block diagram of an embodiment of an identity authentication device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "comprising" means "including, but not necessarily limited to"; it specifically indicates open-ended inclusion or membership in a so-described combination, group, series and the like.

In general, the word "module" as used hereinafter refers to logic embodied in hardware or firmware, or to a collection of software instructions, written in a programming language such as, for example, Java, C, or assembly. One or more software instructions in the modules may be embedded in firmware such as in an erasable-programmable read-only memory (EPROM). It will be appreciated that the modules may comprise connected logic units, such as gates and flip-flops, and may comprise programmable units, such as programmable gate arrays or processors. The modules described herein may be implemented as either software and/or hardware modules and may be stored in any type of computer-readable medium or other computer storage device.

FIG. 1 illustrates an embodiment of an identity authentication device 100 (hereinafter "the device 100"). The device 100 includes at least a communication unit 10, a storage 20, and a processor 30. The device 100 collects a plurality of browsing records of a plurality of websites and implements a neural network on the browsing records to analyze user browsing habits and create user profiles. The user profiles make up a user profile database. The device 100 further is further configured to receive a browsing record, implement the neural network on the browsing record to determine a browsing habit, compare the browsing habit to the user profiles of the user profile database, determine whether the browsing habit matches one of the user profiles, and authenticate an identity of a user according to a result of comparison. In at least one embodiment, the device 100 may be, but is not limited, a smart phone, a tablet computer, a desktop computer, or an online server.

It should be understood that FIG. 1 does not illustrate every component of the device 100, and that the device 100 may include other components, such as a circuit board, a sound system, an input/output port, a battery, an operating system, and the like.

The communication unit 10 establishes communication between the device 100 and a plurality of online servers (not shown in figures).

In at least one embodiment, the communication unit 10 may establish communication with the online servers through a wired or a wireless means. The wired means may be, but is not limited to, Internet, local area network, or the like. The wireless means may be, but is not limited to, Wireless Fidelity (WIFI), radio, a cellular network, a satellite network, a broadcast network, or the like. The wireless communication technology may be, but is not limited to, global system for mobile communications (GSM), general packet radio service (GPRS), code division multiple access (CDMA), W-CDMA, CDMA2000, IMT single carrier, enhanced data rates for GSM evolution (EDGE), long-term evolution (LTE), time-division LTE (TD-LTE), high performance radio local area network (HiperLAN), high performance radio wide area network (HiperWAN), local multipoint distribution service (LMDS), worldwide interoperability for microwave access (WiMAX), ZigBee, BLUETOOTH, flash orthogonal frequency-division multiplexing (Flash-OFDM), high capacity spatial division multiple access (HC-SDMA), universal mobile telecommunications system (UMT S), UMTS time-division duplexing (UMTS-TDD), evolved high speed packet access (HSPA+), time division synchronous code division multiple access (TD-SCDMA), evolution-data optimized (EV-DO), digital enhanced cordless telecommunications (DECT), or the like.

The storage 20 stores a plurality of data of the device 100. In at least one embodiment, the storage 20 may include, but is not limited to, a read-only memory, a random access memory, a programmable read-only memory, an erasable programmable read-only memory, a one-time programmable read-only memory, an electrically-erasable programmable read-only memory, an electrically-erasable programmable read-only memory, a compact disc read-only memory, or other optical storage disk, magnetic storage disc, or magnetic storage tape.

The processor 30 may include, but is not limited to, one or more central processing units (CPU), microprocessing units, data processing chips, graphics processors, or the like.

The input unit 40 provides an input interface. In at least one embodiment, the input unit 40 may include, but is not limited to, a mouse, a keyboard, a touch screen, a camera, or a remote control.

The output unit 50 may output data, such as audio, text, image, or video data.

Figure 2:
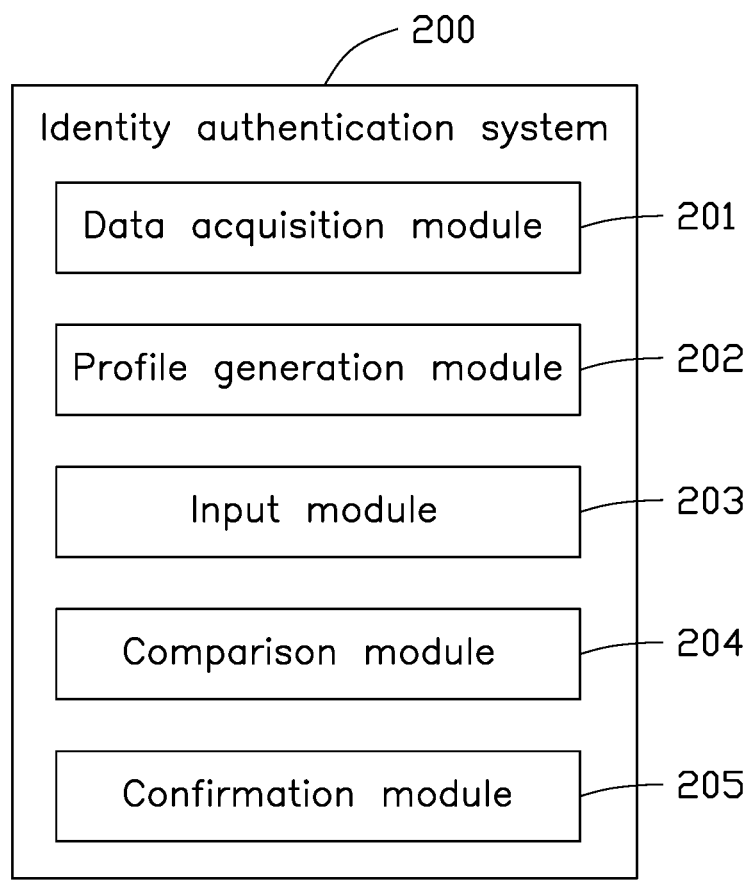
FIG. 2 is a block diagram of an identity authentication system implemented in the identity authentication device of FIG. 1.

Referring to FIG. 2, the device 100 implements an identity authentication system 200 (hereinafter "the system 200"). The system 200 includes a plurality of modules, which are a plurality of instructions stored in the storage 20 and executed by the processor 30.

The system 200 includes a data acquisition module 201, a profile generation module 202, an input module 203, a comparison module 204, and a confirmation module 205.

The data acquisition module 201 obtains from the plurality of online servers a plurality of browsing records of a plurality of websites. In at least one embodiment, each online browsing record includes, but is not limited to, an IP address, a time of browsing a website, a website address, a browsing time duration of the website, and website cookies.

The profile generation module 202 generates the user profiles according to the browsing records received by the data acquisition module 201. The profile generation module 202 learns the browsing habit of a user according to the browsing record of the user profile. In detail, the profile generation module 202 first arranges the plurality of browsing records into a plurality of groups according to the IP address. For example, the browsing records of an IP address "A" are arranged in group "A", the browsing records of an IP address "B" are arranged in group "B", the browsing records of an IP address "C" are arranged in group "C", and so on. Then, the profile generation module 202 generates the corresponding user profile according to the browsing record of each group. For example, a user profile "U1" corresponds to all of the browsing records for group "A", a user profile "U2" corresponds to all of the browsing records for group "B", a user profile "U3" corresponds to all of the browsing records for group "C", and so on. Finally, the neural network is used to learn the browsing habits of the user profiles according to the browsing records of the user profiles. In at least one embodiment, the profile generation module 202 generates the user profile database with the user profiles, and each user profile corresponds to a browsing habit of a user. The user profile database may be stored in the storage 20.

The input unit 203 receives the browsing record of a user. In at least one embodiment, the browsing record is input through the input unit 40. In another embodiment, the browsing record is input through another electronic device (not shown). The browsing record is input in chronological order. For example, when a user browses websites "A", "B", and "C" in that order, the browsing record is input in the same order.

The comparison module 204 compares the browsing record received by the input module 203 to the browsing habits of the user profiles in the user profile database. The comparison module 204 determines whether a similarity of one of the browsing habits to the browsing record is greater than a preset value, such as 50%.

When the similarity of one of the browsing habits to the browsing record is greater than the preset value, the confirmation module 205 confirms a high possibility that a user of the browsing record is the same as a user of the browsing habit. When the similarity of the browsing record to the browsing habit is less than the preset value, the confirmation module 205 confirms a low possibility that a user of the browsing record is the same as the user of the browsing habit.

The confirmation module 205 outputs the confirmation through the output unit 50.

For example, the browsing record received by the input module 203 includes a browsing history of a continuous number of days. The browsing history may show a user browsing a news website "A" for half an hour between 8 and 9 o'clock in the morning, followed by a website "B" at 10 o'clock for half an hour, and finally a website "C" for an hour in the evening. The comparison module 204 determines whether the similarity of the browsing record to the user profile U1 is greater than the preset value, and the confirmation module 205 confirms whether the user of the browsing record has a high probability to be the same as the user of the user profile U1.

In at least one embodiment, the confirmation module 205 sends the confirmation result through the communication unit 10 to another electronic device, so that a user of the other electronic device may see the confirmation result.

For example, if the police determines that a user at the IP address "A" is a criminal, and the criminal has fled, the police can input the browsing record of the IP address "A", and the browsing record is compared to the browsing habits of the user profile database. When the browsing habit at IP address "B" has a similarity to the browsing habit at IP address "A" greater than the preset value, then the police can confirm that the user at IP address "B" has a high probability to be the user at IP address "A".

Figure 3:
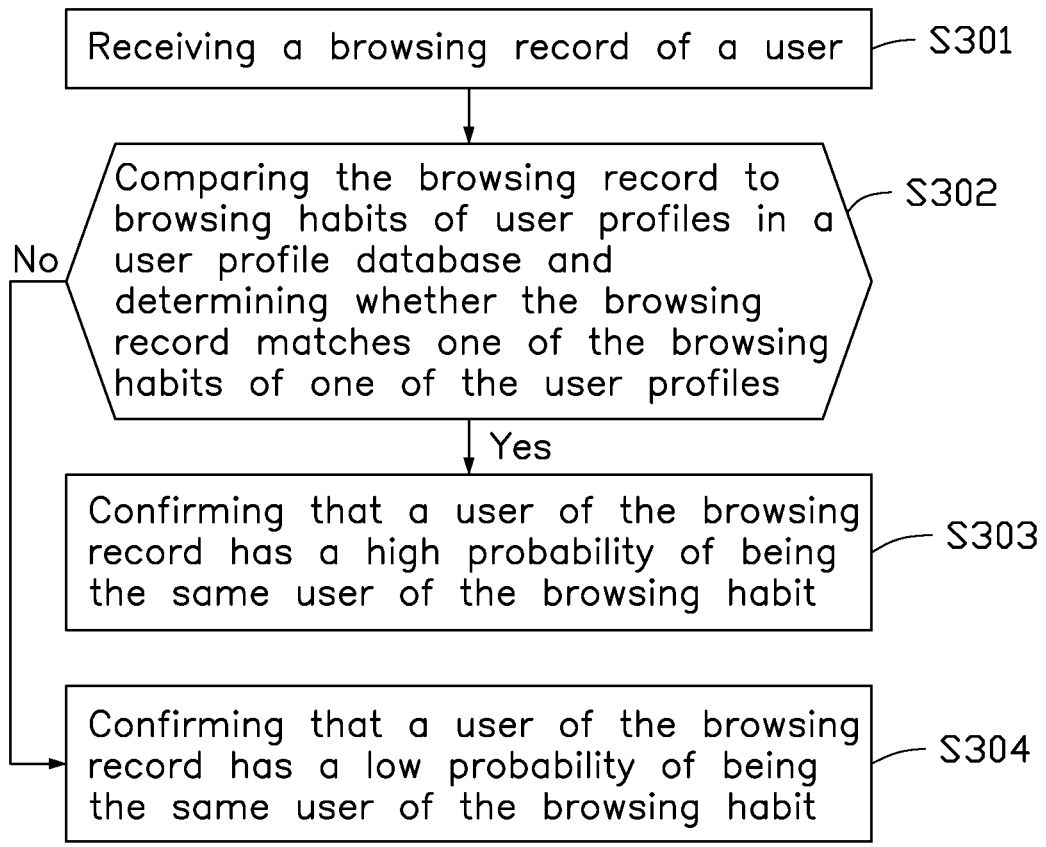
FIG. 3 is flow chart of a method for authenticating an identity.

FIG. 3 illustrates a flowchart of an exemplary method for authenticating an identity. The example method is provided by way of example, as there are a variety of ways to carry out the method. The method described below can be carried out using the configurations illustrated in FIGS. 1-2, for example, and various elements of these figures are referenced in explaining the example method. Each block shown in FIG. 3 represents one or more processes, methods, or subroutines carried out in the example method. Furthermore, the illustrated order of blocks is by example only, and the order of the blocks can be changed. Additional blocks can be added or fewer blocks can be utilized, without departing from this disclosure. The example method can begin at block S301.

At block S301, the input module 203 receives the browsing record of a user.

In at least one embodiment, the browsing record is input through the input unit 40. In another embodiment, the browsing record is input through another electronic device (not shown). The browsing record is input in chronological order. For example, when a user browses websites "A", "B", and "C" in that order, the browsing record is input in the same order.

At block S302, the comparison module 204 compares the browsing record received by the input module 203 to the browsing habits of the user profiles in the user profile database and determines whether the browsing record matches one of the browsing habits of one of the user profiles. When the browsing record matches one of the browsing habits of one of the user profiles, block S303 is implemented. When the browsing record does not match one of the browsing habits of one of the user profiles, block S304 is implemented.

At block S303, the confirmation module 205 confirms that a user of the browsing record has a high probability of being the same user of the browsing habit.

At block S304, the confirmation module 205 confirms that a user of the browsing record has a low probability of being the same user of the browsing habit.

Figure 4:
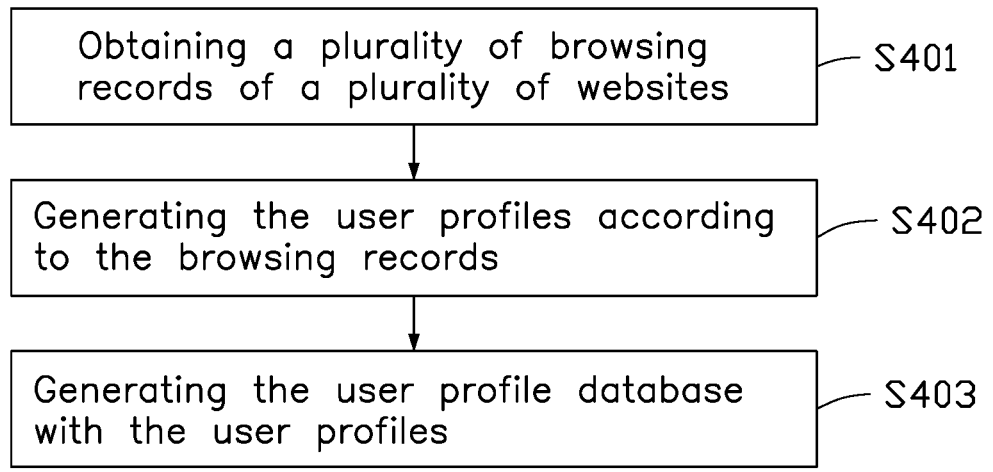
FIG. 4 is a flow chart of a method for creating a user profile database.

Referring to FIG. 4, before block S301, the method further includes the following steps.

At block S401, the data acquisition module 201 obtains from a plurality of online servers a plurality of browsing records of a plurality of websites. \

In at least one embodiment, each online browsing record includes, but is not limited to, an IP address, a time of browsing a website, a website address, a browsing time duration of the website, and website cookies.

At block S402, the profile generation module 202 generates the user profiles according to the browsing records received by the data acquisition module 201. The profile generation module 202 learns the browsing habit of a user according to the browsing record of the user profile.

In detail, the profile generation module 202 first arranges the plurality of browsing records into a plurality of groups according to the IP address. For example, the browsing records of an IP address "A" are arranged in group "A", the browsing records of an IP address "B" are arranged in group "B", the browsing records of an IP address "C" are arranged in group "C", and so on. Then, the profile generation module 202 generates the corresponding user profile according to the browsing record of each group. For example, a user profile "U1" corresponds to all of the browsing records for group "A", a user profile "U2" corresponds to all of the browsing records for group "B", a user profile "U3" corresponds to all of the browsing records for group "C", and so on. Finally, the neural network is used to learn the browsing habits of the user profiles according to the browsing records of the user profiles.

At block S403, the profile generation module 202 generates the user profile database with the user profiles, and each user profile corresponds to a browsing habit of a user. The user profile database may be stored in the storage 20.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. An identity authentication device comprising:
   a communication unit configured to establish communication with a plurality of online servers;
   a processor; and
   a storage configured to store a user profile database comprising a plurality of user profiles, wherein each of the plurality of user profiles corresponds to an online browsing habit, the storage further configured to store a plurality of instructions, which when executed by the processor, cause the processor to:
      receive an online browsing record of a user, the online browsing record comprising a record of websites browsed within a preset time period recorded in chronological order, wherein the online browsing record comprises an IP address, a time of browsing a website, a website address, a browsing time duration of the website, and website cookies;
      compare the received online browsing record to the online browsing habits of the user profiles stored in the user profile database to determine whether the received online browsing record matches one of the online browsing habits; and
      determine whether the received online browsing record belongs to a same user of a matched one of the user profiles according to a result of comparison,
   wherein the processor creates the user profile database by:
      collecting a plurality of browsing records of a plurality of websites from a plurality of online servers;
      arranging the plurality of browsing records into a plurality of groups according to the IP address of the plurality of browsing records, wherein each IP address corresponds to one group;
      generating the user profiles of the groups according to the browsing records;
      using a neural network to learn the browsing habits of the user profiles according to the browsing records of the user profiles; and
      generating the user profile database with the user profiles.

2. The identity authentication device of claim 1, wherein the identity authentication device uses the neural network to learn the browsing habits of each user profile according to the browsing records.

3. A method for authenticating an identity, the method comprising:
   receiving an online browsing record of a user, the online browsing record comprising a record of websites browsed within a preset time period recorded in chronological order, wherein the online browsing record comprises an IP address, a time of browsing a website, a website address, a browsing time duration of the website, and website cookies;
   comparing the received online browsing record to a plurality of online browsing habits of a plurality of user profiles of a user profile database to determine whether the received online browsing record matches one of the online browsing habits; and
   determining whether the received online browsing record belongs to a same user of a matched one of the user profiles according to a result of comparison,
   wherein the user profile database is created by:
      collecting a plurality of browsing records of a plurality of websites from a plurality of online servers;
      arranging the plurality of browsing records into a plurality of groups according to the IP address of the plurality of browsing records, wherein each IP address corresponds to one group;
      generating the user profiles of the groups according to the browsing records;
      using a neural network to learn the browsing habits of the user profiles according to the browsing records of the user profiles; and
   generating the user profile database with the user profiles.

4. The method of claim 3, wherein the identity authentication device uses the neural network to learn the browsing habits of each user profile according to the browsing records.

5. A non-transitory storage medium having stored thereon instructions that, when executed by at least one processor of an identity authentication device, causes the at least one processor to execute instructions of a method for authenticating an identity, the method comprising:
   receiving an online browsing record of a user, the online browsing record comprising a record of websites browsed within a preset time period recorded in chronological order, wherein the online browsing record comprises an IP address, a time of browsing a website, a website address, a browsing time duration of the website, and website cookies;

comparing the received online browsing record to a plurality of online browsing habits of a plurality of user profiles of a user profile database to determine whether the received online browsing record matches one of the online browsing habits; and determining whether the received online browsing record belongs to a same user of a matched one of the user profiles according to a result of comparison, wherein the user profile database is created by:
    collecting a plurality of browsing records of a plurality of websites from a plurality of online servers;
    arranging the plurality of browsing records into a plurality of groups according to the IP address of the plurality of browsing records, wherein each IP address corresponds to one group;
    generating the user profiles of the groups according to the browsing records;
    using a neural network to learn the browsing habits of the user profiles according to the browsing records of the user profiles; and
    generating the user profile database with the user profiles.

6. The non-transitory storage medium of claim 5, wherein the identity authentication device uses the neural network to learn the browsing habits of each user profile according to the browsing records.

\* \* \* \* \*